(12) United States Patent
Deng et al.

(10) Patent No.: US 11,572,688 B2
(45) Date of Patent: Feb. 7, 2023

(54) PREFABRICATED, MOVABLE, PHOTOSENSITIVE, SOLAR LANDSCAPE PAVILION CAPABLE OF BEING DISASSEMBLED AND CONSTRUCTED QUICKLY

(71) Applicant: TONGJI UNIVERSITY, Shanghai (CN)

(72) Inventors: Feng Deng, Shanghai (CN); An Guo, Shanghai (CN); Zishuo Huang, Shanghai (CN); Bingjie Li, Shanghai (CN); Yanbing Qiu, Shanghai (CN); Yunni Gan, Shanghai (CN); Jin Liao, Shanghai (CN); Yonghao Xu, Shanghai (CN); Dehan Li, Shanghai (CN); Peiyu Kong, Shanghai (CN); Yingxin Zhang, Shanghai (CN); Yinan Li, Shanghai (CN); Zhuoqun Zhu, Shanghai (CN); Qilin Wu, Shanghai (CN); Haoyi Ma, Shanghai (CN)

(73) Assignee: Tongji University, Shanghai (JP)

( * ) Notice: Subject to any disclaimer, the term of this patent is extended or adjusted under 35 U.S.C. 154(b) by 0 days.

(21) Appl. No.: 17/269,353

(22) PCT Filed: Aug. 3, 2020

(86) PCT No.: PCT/CN2020/106523
§ 371 (c)(1),
(2) Date: Feb. 18, 2021

(87) PCT Pub. No.: WO2021/093382
PCT Pub. Date: May 20, 2021

(65) Prior Publication Data
US 2022/0018113 A1    Jan. 20, 2022

(30) Foreign Application Priority Data
Nov. 15, 2019  (CN) .......................... 201911120669.3

(51) Int. Cl.
E04B 1/344    (2006.01)
E04B 1/343    (2006.01)
(Continued)

(52) U.S. Cl.
CPC ........ *E04B 1/3442* (2013.01); *E04B 1/34384* (2013.01); *E04H 1/1205* (2013.01);
(Continued)

(58) Field of Classification Search
CPC .... E04B 1/34384; E04B 1/3442; E04B 1/344; E04H 1/1205; F21S 9/035; F21V 1/06;
(Continued)

(56) References Cited

FOREIGN PATENT DOCUMENTS

| CN | 102108735 A | 6/2011 |
|---|---|---|
| CN | 205743087 U | 11/2016 |

(Continued)

OTHER PUBLICATIONS

PCT/ISA/210 from International Application PCT/CN2020/106523.

*Primary Examiner* — Britt D Hanley
(74) *Attorney, Agent, or Firm* — Carrier Blackman & Associates, P.C.; Joseph P. Carrier; Fulchand P. Shende

(57) ABSTRACT

The disclosure relates to a prefabricated movable photosensitively adjustable solar bionic landscape pavilion capable of being disassembled and constructed quickly. The landscape pavilion comprises a support structure, a ceiling, a movable platform, a linkage system, a lighting system, and an energy system. The support structure is arranged at the center of the movable platform and forms large-area shelter space with the ceiling. The ceiling may rotate around the support structure in the height direction of the support structure, so as to be unfolded or folded. The movable platform is a base of the landscape pavilion, undertakes the support structure and the ceiling above the movable platform, and meanwhile, (Continued)

provides fixing space for the linkage system, the lighting system, and the energy system.

11 Claims, 12 Drawing Sheets

(51) Int. Cl.
*E04H 1/12* (2006.01)
*F21V 33/00* (2006.01)
*F21S 9/03* (2006.01)
*F21Y 115/10* (2016.01)

(52) U.S. Cl.
CPC ............ *F21S 9/035* (2013.01); *F21V 33/006* (2013.01); *F21Y 2115/10* (2016.08)

(58) Field of Classification Search
CPC . F21V 23/003; F21V 33/006; F21W 2131/10; F21Y 2115/10
See application file for complete search history.

(56) References Cited

FOREIGN PATENT DOCUMENTS

| | | | |
|---|---|---|---|
| CN | 206448610 U | | 8/2017 |
| CN | 207211820 U | | 4/2018 |
| CN | 208934467 U | * | 6/2019 |
| CN | 209585697 U | * | 11/2019 |
| CN | 111305384 A | | 6/2020 |
| CN | 211622772 U | * | 10/2020 |
| CN | 214047836 U | * | 8/2021 |
| DE | 102009019325 A1 | | 11/2010 |

* cited by examiner

PREFABRICATED, MOVABLE, PHOTOSENSITIVE, SOLAR LANDSCAPE PAVILION CAPABLE OF BEING DISASSEMBLED AND CONSTRUCTED QUICKLY

TECHNICAL FIELD

The disclosure relates to the technical field of buildings, and in particular, to a prefabricated movable photosensitively adjustable solar bionic landscape pavilion capable of being disassembled and constructed quickly.

BACKGROUND

A landscape pavilion is easy to construct, and is common in an urban park, a commercial square, a characteristic town and a rural garden. It has abundant and various functions, can be used for displaying, resting, gathering, shading, sheltering from rain, landscaping and the like, and can also be used as the symbol of an important space in a city and a countryside. In recent years, with the increasing demands of people for space and life quality, the number of landscape pavilions is also increasing, which injects new spatial vitality into the city and the countryside, provides service for public life, and becomes the symbol of the urban and rural culture.

At present, most landscape pavilions adopt reinforced concrete frame structures or steel structures. The materials are not environmentally friendly, the construction cost is high, the construction speed is low, the damage to the site and environment is great, and the use adaptability is low. So, it is a burning problem how to reduce the construction cost and shorten the construction time of a landscape pavilion, reduce the influence of the landscape pavilion on the site and environment and improve the use adaptability and efficiency of the landscape pavilion.

Generally, the landscape pavilion is open in space and relatively monotonous, and the number of users varies greatly in different seasons and weather conditions. How to make the landscape pavilion adapt to different weathers, provide rich space and improve the use efficiency so as to create more comfortable, convenient and environmentally friendly space is an important development and promotion direction of the landscape pavilion.

The landscape pavilion has high flexibility and does not have an absolutely fixed place. Its function and position should change correspondingly along with the changes of the site functions and the overall spatial layout. How to make the landscape pavilion adapt to the changes of the overall spatial layout and the functions is also a problem to be solved.

Generally, night lighting of the landscape pavilion can increase the use possibility of the landscape pavilion and prolong the service time, and can also provide basic lighting for the site and the environment space. However, usually the night lighting of the landscape pavilion is provided by the urban power grid and needs to consume certain energy, and the position of the landscape pavilion must be fixed to meet the requirement of a fixed power grid. Nowadays, under the advocacy of sustainable development, it is an important design and thinking direction of the landscape pavilion how to achieve the mobility of the landscape pavilion, meet the requirements of the night lighting and the landscape, extend the use possibility, prolong the service time, and save energy without depending on the power supply of the urban power grid.

SUMMARY

The disclosure aims to provide a flexible and changeable prefabricated movable photosensitively adjustable solar bionic landscape pavilion capable of being disassembled and constructed quickly to overcome the defects in the prior art.

In function, the landscape pavilion can provide convenience in sun shading and rain sheltering for tourists, pedestrians and customers, and create rich public living space; in construction, the landscape pavilion is low in construction material cost, can be disassembled and constructed rapidly, and has low influence on site and environment; in design, the landscape pavilion adapts to the changes of different weathers, climates, sites and functions, and is variable in position and space; in energy source, the landscape pavilion reasonably utilizes renewable solar energy, meets the requirements on night lighting and landscaping, extends the use possibility, prolongs the service time and saves resources and energy; in spirit, the landscape pavilion brings a symbol with cultural connotation to a city and a countryside.

The purpose of the disclosure is achieved by the following technical solution that: a prefabricated movable photosensitively adjustable solar bionic landscape pavilion capable of being disassembled and constructed quickly comprises a support structure, a ceiling, a movable platform, a linkage system, a lighting system, and an energy system; the support structure is arranged at the center of the movable platform and forms large-area shelter space with the ceiling; the ceiling may rotate around the support structure in the height direction of the support structure so as to be unfolded or folded; the movable platform is a base of the landscape pavilion, undertakes the support structure and the ceiling above the movable platform, and meanwhile, provides fixing space for the linkage system, the lighting system, and the energy system.

Further, the support structure comprises beams of a polygonal structure; a central column and two peripheral columns are arranged at an intersection point of every two beams to form a pyramid structure; each central column is connected to the corresponding peripheral columns in an inserting manner by T-shaped steel components with certain angles; the steel components are connected to the central columns and the peripheral columns by bolts and screws, and may be split when necessary. The central columns and the peripheral columns are connected to the beams in the inserting manner by T-shaped steel components; the steel components are connected to the beams by bolts and screws, and may be split when necessary.

Further, the support structure comprises multiple groups of pyramid structures of the same structure; the tops of the multiple groups of the pyramid structures are connected through the beams; the bottoms of the multiple groups of the pyramid structures form a stable overall structure with the movable platform; the bottoms of the central columns of each group of the pyramid structures are connected to the inner side of the movable platform; the two peripheral columns are connected to the outer side of the movable platform.

Further, the support structure further comprises wind resistant steel cables; the wind resistant steel cables are multistranded and detachable; the two ends of each of the wind resistant steel cables are respectively connected to the outer edge vertexes of the ceiling and the outer edge vertexes of a polygon of the movable platform; the lengths of the wind resistant steel cables are fixed; when the ceiling is opened to the maximum, the wind resistant steel cables are tightened, and the ceiling is not opened any longer, such that the ceiling is prevented from being uncovered by extreme wind in extreme weather conditions.

The ceiling is arranged between the support structure and the movable platform and is connected to the support structure at the upper part. The ceiling is arranged in the axial direction of the support structure, and the ceiling may rotate around the support structure in the height direction of the support structure so as to be unfolded or folded.

The ceiling consists of a steel cable-wood structural frame and flexible membranes. The flexible membranes have rainproof, sun-shading and breathable performance, and meanwhile, is strong in weather resistance. The ceiling is divided into multiple modules with consistent shapes and sizes; the top of each module is hinged to the top of the support structure.

Each module of the ceiling consists of a driving panel, a driven panel, and a flexible panel.

The driving panels are formed by fixedly connecting multiple wood beams with flexible beams; the wood beams are connected to one another by T-shaped steel components, are connected by bolts and screws, and may be split when necessary; the wood beams are fixedly connected to the flexible membranes. Pulleys are arranged on the wood beams of the driving panels; the pulleys are connected to the structural cables of the linkage system; the driving panels are rotated at the upper ends of the central columns within the range of 60 degrees by means of the pulling of the structural cables.

The driven panels are formed by fixedly connecting multiple wood beams with flexible membranes; the wood beams are connected to one another by T-shaped steel components, are connected by bolts and screws, and may be split when necessary; the wood beams are fixedly connected to the flexible membranes. The driven panels are connected to the beams of the support structure through metal hinges, and may rotate outside the beams within the range of 90 degrees.

The flexible panels consist of steel cables and flexible membranes; multiple groups of the driving panels are fixedly connected to multiple groups of the driven panels through the flexible panels; the edges of the flexible membranes are covered, so the steel cables may slide therein freely.

Further, the driving panels may rotate and unfold around the top of the support structure, such that the flexible panels are tensioned and overturned to drive the driven panels to rotate and unfold, thereby increasing the area of the ceiling.

Or, the driving panels may rotate and fold around the top of the support structure, such that the flexible panels are tensioned and overturned to drive the driven panels to rotate and fold, thereby reducing the area of the ceiling.

Further, the movable platform is of a polygonal structure; the support structure is located at the center of the movable platform; the bottom of each of the central columns and the peripheral columns of the support structure is rigidly connected to the movable platform, wherein the central columns on the inner side are directly connected to the movable platform in the inserting manner by bolts; the peripheral columns on the outer side are connected to the movable platform in the inserting manner by T-shaped steel pieces.

The movable platform comprises a wood plate plane, a steel structural frame, and bottom steel wheels; the wood plate plane is connected to the steel structural frame through keels; the bottom steel wheels are universal wheels with brakes, are arranged at the bottom of the steel structural frame and uniformly distributed along the outer side and the inner side, and meanwhile, are connected to the steel structural frame by bolts. After the construction of the landscape pavilion is completed, a pavilion body may be pushed to adjust the position thereof; after the position is determined, the position of the landscape pavilion may be fixed by adjusting a brake button so as to prevent the landscape pavilion from moving.

Further, the wood plate plane comprises fixed wood plates and movable wood plates; one side of each movable wood plate is fixedly hinged to the corresponding fixed wood plate; the opposite side of each movable wood plate rotates as needed and forms a certain opening angle with the platform on which the fixed plates are located; the range of the opening angle is 0 to 90 degrees, preferably, 45 degrees, such that a backrest is formed to provide a rest facility for a tourist.

The steel structural frame is formed by splicing steel pipes with square sections by bolts, and may be split when necessary. The wood plate plane is paved on the steel structural frame to form a polygonal frame structure provided with a polygonal center hole in the center; the steel structural frame is connected to the support structure by bolts.

Further, the linkage system comprises structural cables, a connecting steel plate, a central main steel cable, a fixed pulley, and a motor; the structural cables are multistranded; one end of each structural cable is connected to the wood beam of the corresponding driving panel of the ceiling and the pulley at the top end of the corresponding central column of the support structure; the other ends of the structural cables intersect at the center of the landscape pavilion and are fixed to the connecting steel plate; one end of the central main steel cable is connected to the connecting steel plate; the other end of the central main steel cable penetrates through the fixed pulley, and finally winds the motor to realize the opening and closing of the ceiling; the fixed pulley is fixed to the center of the steel structural frame of the movable platform by bolts; the motor is fixed to the bottom of the steel structural frame of the movable platform by bolts.

The motor controls the height of the connecting steel plate by tightening and loosening the central main steel cable; the connecting steel plate drives the structural cable to change the position thereof so as to pull the ceiling and adjust the opening angle of the ceiling.

The lighting system consists of LED light strips; the light strips are arranged along the inner sides of the support structure and a skeleton and are connected to the energy system; electric energy is provided for the light strip by the energy system, and meanwhile, the turn-on time of the light strips is controlled by a photosensitive induction control assembly of the energy system; the light strips are automatically turned off when natural light is sufficient in the daytime; the light strips are automatically turned on when the natural light is dark during the night.

The energy system comprises solar panels, a storage battery, and an induction control assembly; the energy system provides the electric energy for the linkage system to open and close the ceiling. The energy system provides the electric energy for the lighting system to realize night lighting of the landscape pavilion.

Two groups of the solar panels in total are fixed to the top end of the support structure; each group of the solar panels consists of multiple solar panels with the same size and is connected to the storage battery.

The storage battery is fixed to the bottom of the movable platform and is adjacent to the motor. The storage battery is characterized by low voltage and high capacity, and provides sufficient power for the motor. When the sunlight is sufficient, the electric energy is stored by generating electricity through the solar panels.

The induction control assembly is connected to the storage battery, the lighting system, and the linkage system, and automatically controls to provide corresponding energy source for the lighting system and the linkage system according to the intensity of the natural light.

Further, the induction control assembly comprises a photosensitive inductor and a control system, wherein the photosensitive inductor is located at the top end of the support structure; the control system is located at the bottom end of the movable platform; the control system is connected to the movable platform through a circuit; the control system is connected to the storage battery, the lighting system and the linkage system, controls current of the storage battery to be conducted into the lighting system, and meanwhile, controls the conducting time and direction of the current of the storage battery to the linkage system.

When the sunlight is strong in the daytime, the photosensitive inductor transmits a signal to the control system, and the control system switches on the current of the storage battery and the linkage system and keeps the current flowing in a forward direction; the motor of the linkage system tightens the central main steel cable so as to increase the angle between the ceiling and the support structure, thereby increasing the projection area of the ceiling.

When the natural light is relatively weak or there is rain in the daytime, the photosensitive inductor transmits a signal to the control system, and the control system switches on the current of the storage battery and the linkage system and keeps the current flowing in a reverse direction; the motor of the linkage system loosens the central main steel cable so as to reduce the angle between the ceiling and the support structure, thereby reducing the projection area of the ceiling.

When the natural light is weak near night, the photosensitive inductor transmits a signal to the control system, the control system switches on the current of the storage battery and the lighting system, the LED light strips are turned on to achieve a night lighting effect.

When the natural light is sufficient in the daytime, the photosensitive inductor transmits a signal to the control system, the control system switches off the current of the storage battery and the lighting system; the LED light strips are turned off to save energy.

The landscape pavilion comprises a wireless router which can provide wireless WIFI.

Compared with the prior art, the landscape pavilion disclosed by the disclosure consists of the support system, the ceiling, the movable platform, the linkage system, the lighting system, and the energy system; the ceiling may complete the rotation with the maximum angle of 60 degrees around the support structure in the vertical direction through a linkage device to realize opening and closing; the overall landscape pavilion may move, through the linkage device, in the horizontal direction to adjust the spatial position. The support structure is arranged at the center of the polygonal movable platform, and forms large-area shelter space with the ceiling. The ceiling has sun shading and rain sheltering functions, and is divided into multiple modules with consistent shapes and sizes; each module is hinged to the top of the support structure; the ceiling may rotate around the support structure in the height direction of the support structure, such that the sun-shading rain-sheltering ceiling is unfolded or folded. The movable platform is a base of the landscape pavilion, undertakes upper structures, and meanwhile, provides fixing space for the linkage system, the lighting system, and the energy system; the movable platform consists of wood plates, keels, a steel structure frame, and bottom steel wheels, which ensures the stability and mobility of the landscape pavilion. The linkage system comprises structural cables, a connecting steel plate, a central main steel cable, a fixed pulley, and a motor, and realizes the change of the opening and closing of the ceiling. The lighting system consists of LED light strips; the light strips are arranged along the inner sides of the support structure and the skeleton of the ceiling and are connected to the energy system. The energy system comprises solar panels, the storage battery, and the induction control assembly, and provides corresponding energy source for the linkage device and the lighting system according to the intensity of the natural light. The energy system provides corresponding electric energy for the motor, controls the opening angle, adjusts the projection area of the ceiling, and meets different use requirements. In sunny weather, the ceiling is opened to the maximum and a sun shading effect is good; in cloudy and rainy weather, the ceiling is folded, and rainwater is discharged along the ceiling with a large slope, so the rain sheltering performance is good. The landscape pavilion is attractive and elegant in form, clear in structural system, and highly standardized in components and connecting pieces, and has the characteristics of easiness in fabrication and production, and rapid assembly and construction.

REFERENCE SIGNS IN THE DRAWINGS

100—support structure; 110—central column; 120—peripheral column; 130—beam; 140—wind resistant steel cable; 200—ceiling; 210—driving panel; 211—driving panel wood structural frame; 212—driving panel flexible membrane; 220—driven panel; 221—driven panel wood structural frame; 222—driven panel flexible membrane; 230—flexible panel; 231—flexible panel steel cable; 232—flexible panel flexible membrane; 300—movable platform; 310—wood plate plane; 311—fixed wood plate; 312—movable wood plate; 320—steel structural frame; 330—bottom steel wheel; 400—linkage system; 410—structural cable; 420—connecting steel plate; 430—central main steel cable; 440—fixed pulley; 450—motor; 500—lighting system (LED light strip); 600—energy system; 610—storage battery; 620—solar panel; 630—induction control assembly; 631—photosensitive inductor; 632—control system.

DETAILED DESCRIPTION

The technical solution of the disclosure will now be further described clearly and completely with reference to the accompanying drawings. Apparently, the described embodiments are merely a part rather than all of the embodiments of the disclosure. Based on the embodiments of the disclosure, all other embodiments obtained by those of ordinary skill in the art without creative work fall within the protection scope of the disclosure.

In the description of the disclosure, it should be noted that the orientations or positional relationships indicated by the terms "center", "upper", "lower", "left", "right", "vertical", "horizontal", "inner", "outer", etc. are based on the orientations or positional relationships shown in the accompanying drawings, only for facilitating description of the disclosure and simplifying the description, rather than indicating or implying that the devices or elements must have specific orientations or must be constructed and operated in specific orientations, and thus may not be interpreted as limitation to the disclosure. In addition, the terms "first", "second", and "third" are used for descriptive purposes only and may not be understood as indicating or implying relative importance.

In the description of the disclosure, it should be noted that, unless otherwise expressly specified and limited, the terms "mounted", "coupled" and "connected" are to be interpreted broadly, for example, may be fixedly connected, or detachably connected, or integrally connected; may be mechanically connected, or electrically connected; may be directly connected, or indirectly connected through an intermediate medium, or internally communicated of two elements. For those skilled in the art, the specific meanings of the above terms in the disclosure may be understood in specific situations.

Embodiment 1

Figure 1:
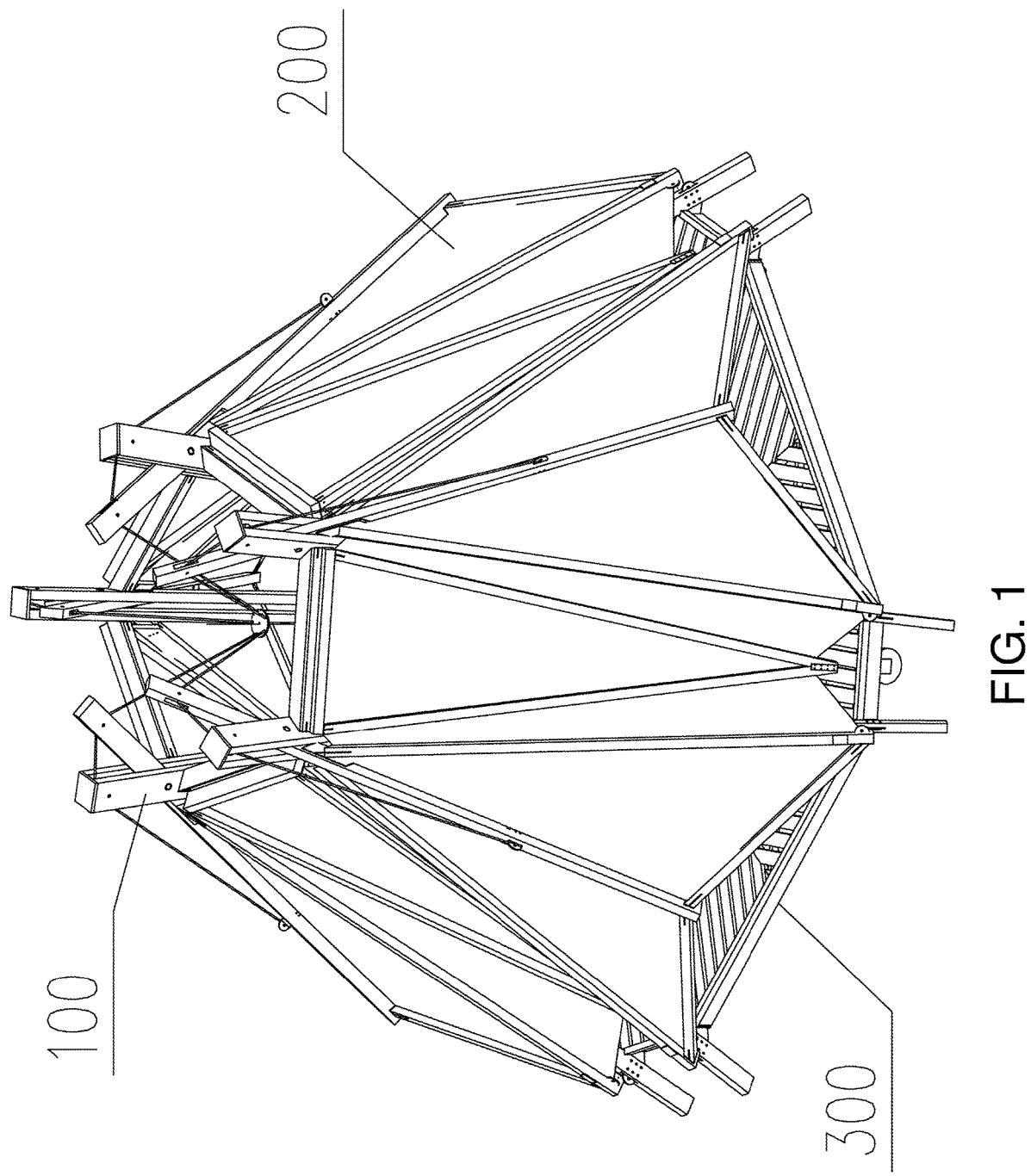
FIG. 1 is a perspective view of a landscape pavilion provided by the embodiment of the disclosure (a ceiling is in a folded state)
Figure 2:
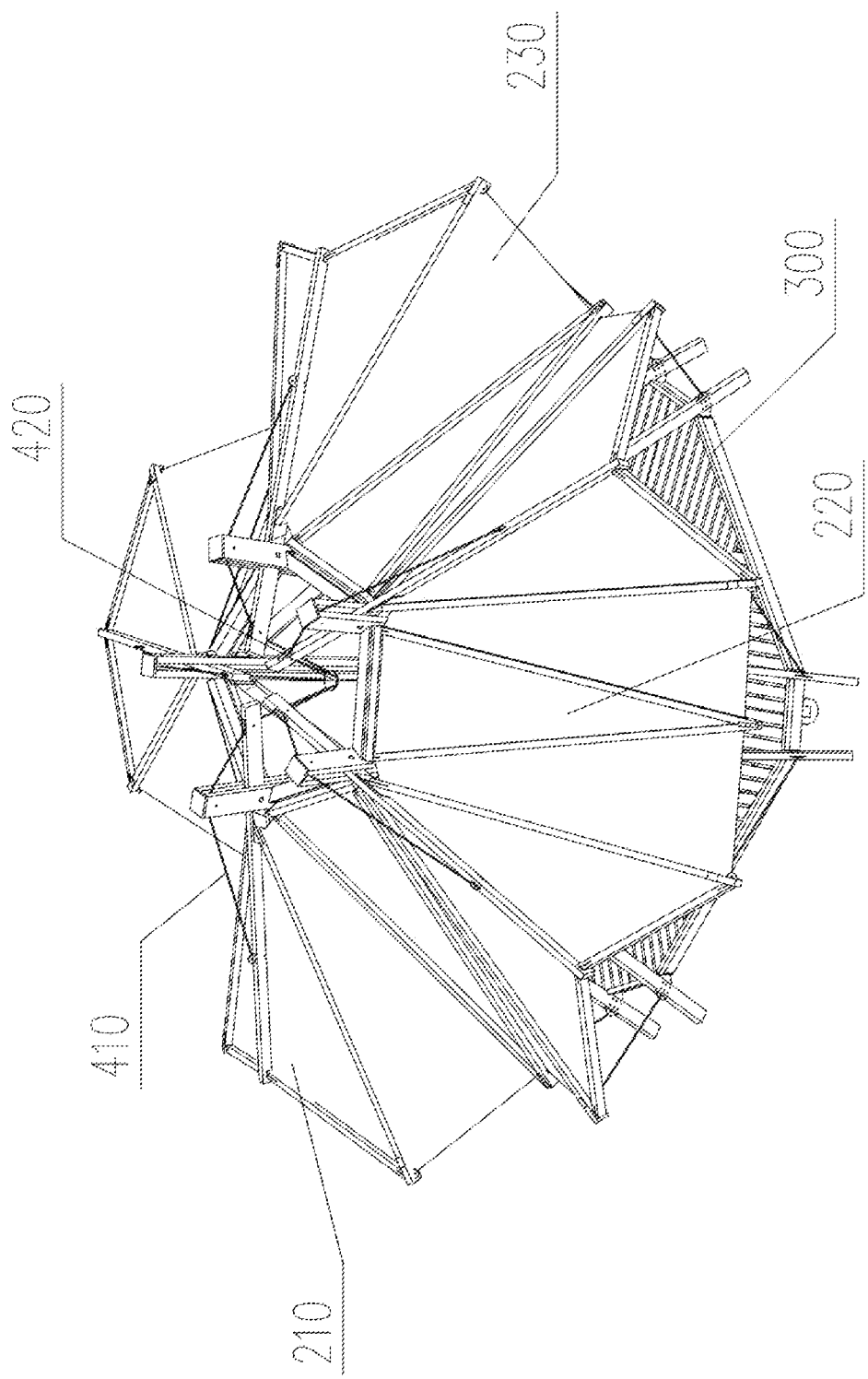
FIG. 2 is a perspective view of the landscape pavilion provided by the embodiment of the disclosure (the ceiling is in a semi-unfolded state)
Figure 3:
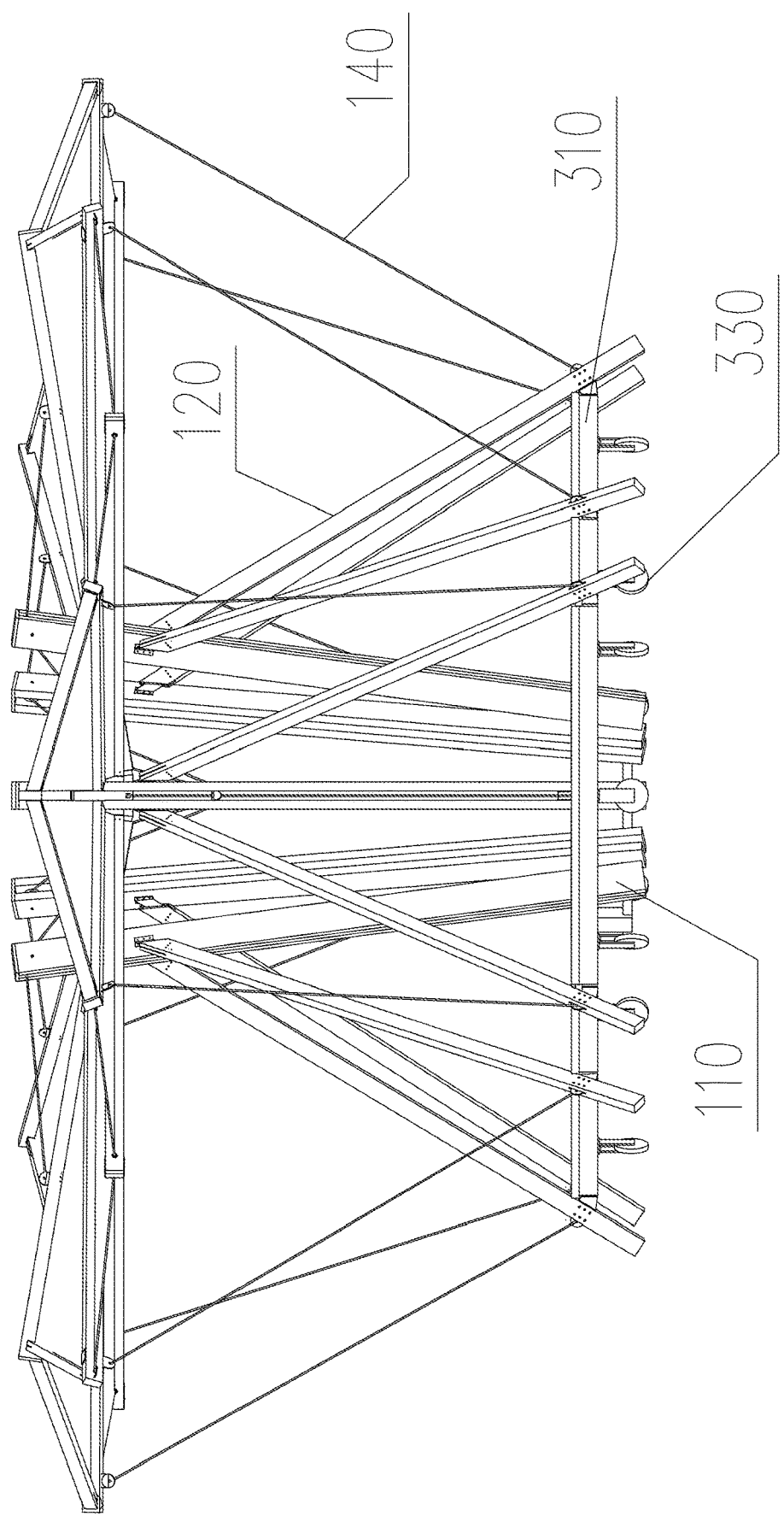
FIG. 3 is a perspective view of the landscape pavilion provided by the embodiment of the disclosure (the ceiling is in a completely unfolded state and movable wood plates are folded in a wood plate plane)
Figure 4:
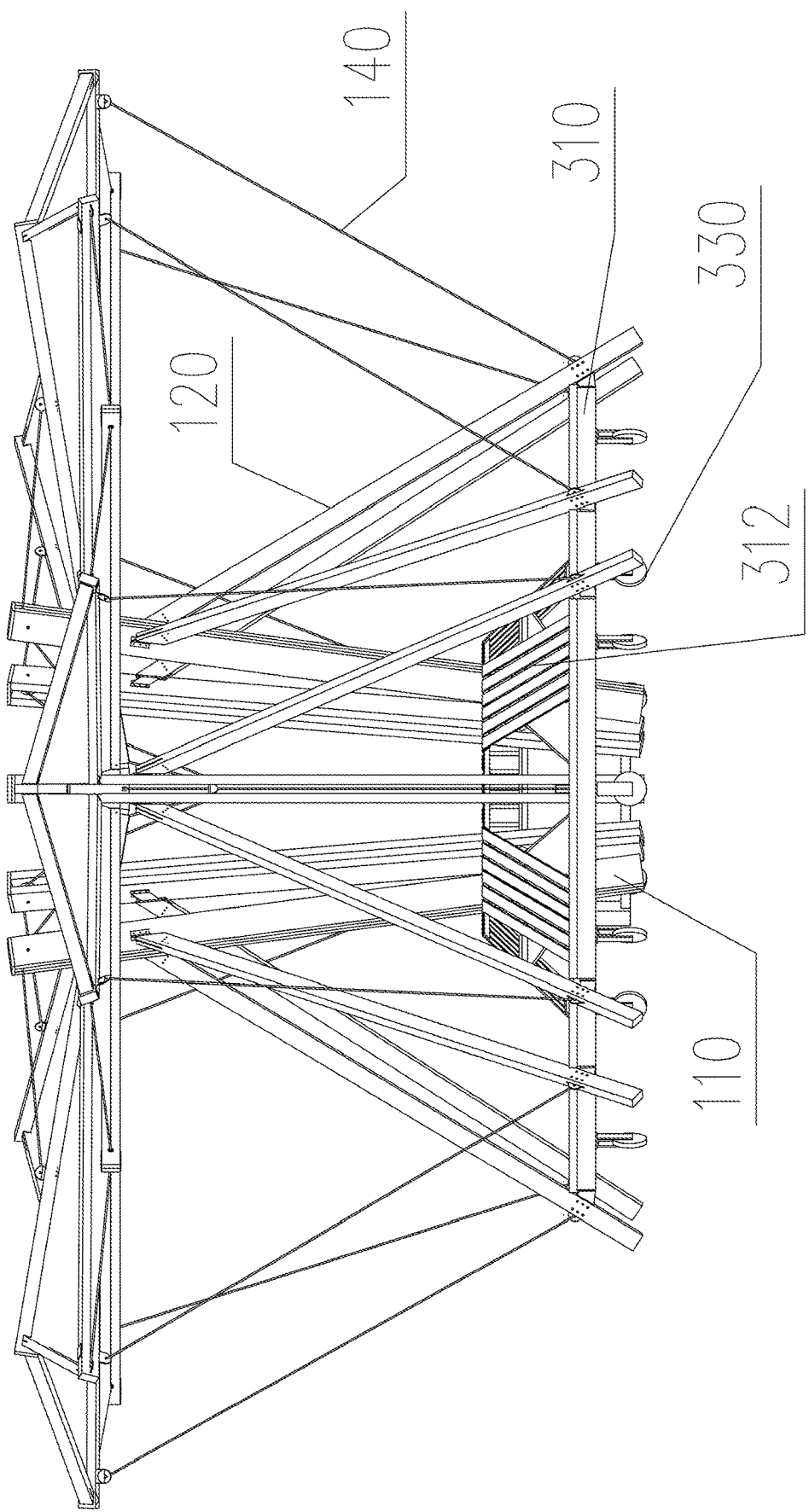
FIG. 4 is a front view of the landscape pavilion provided by the embodiment of the disclosure (the movable wood plates and the wood plate plane form an angle)
Figure 5:
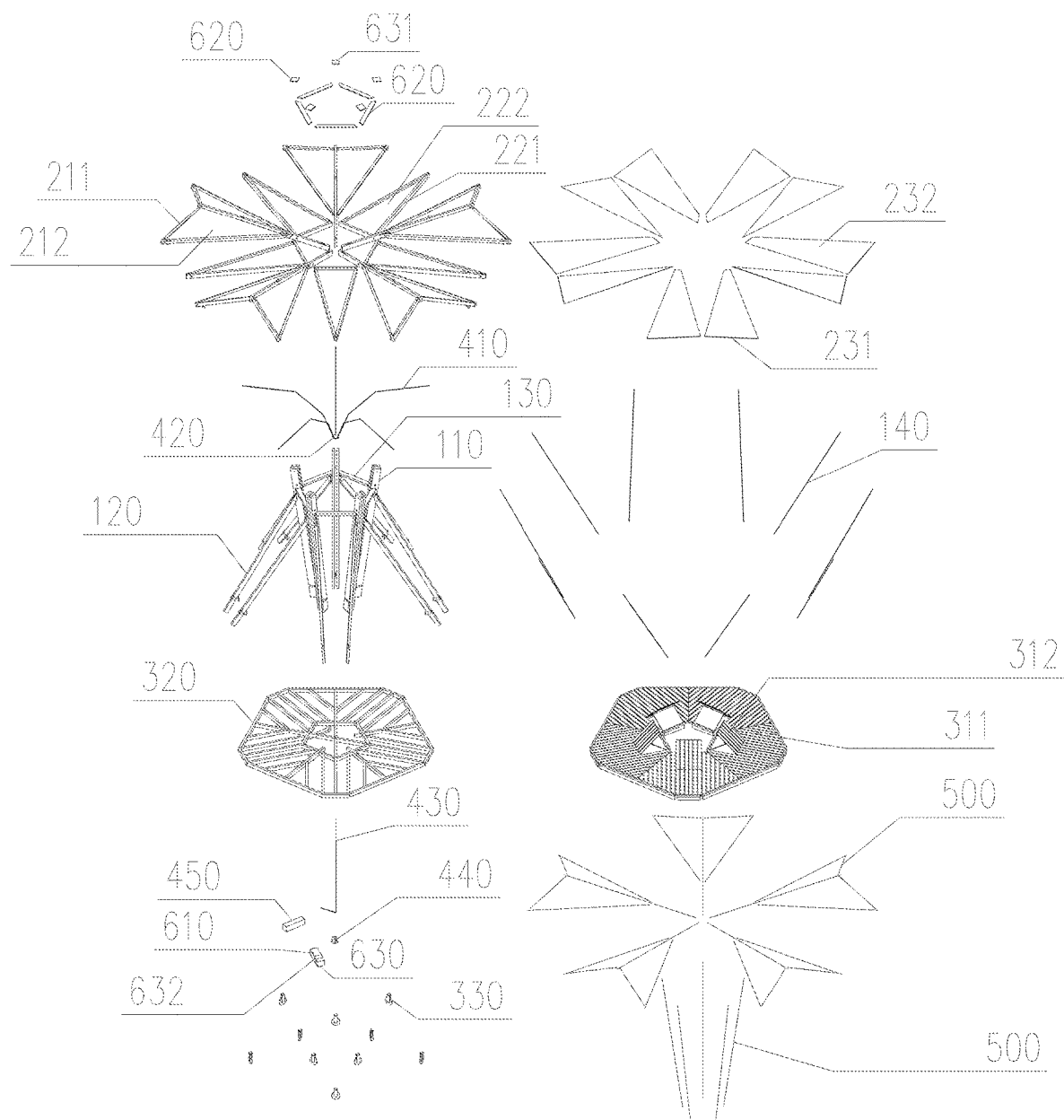
FIG. 5 is an exploded view of the landscape pavilion provided by the embodiment of the disclosure.
Figure 6:
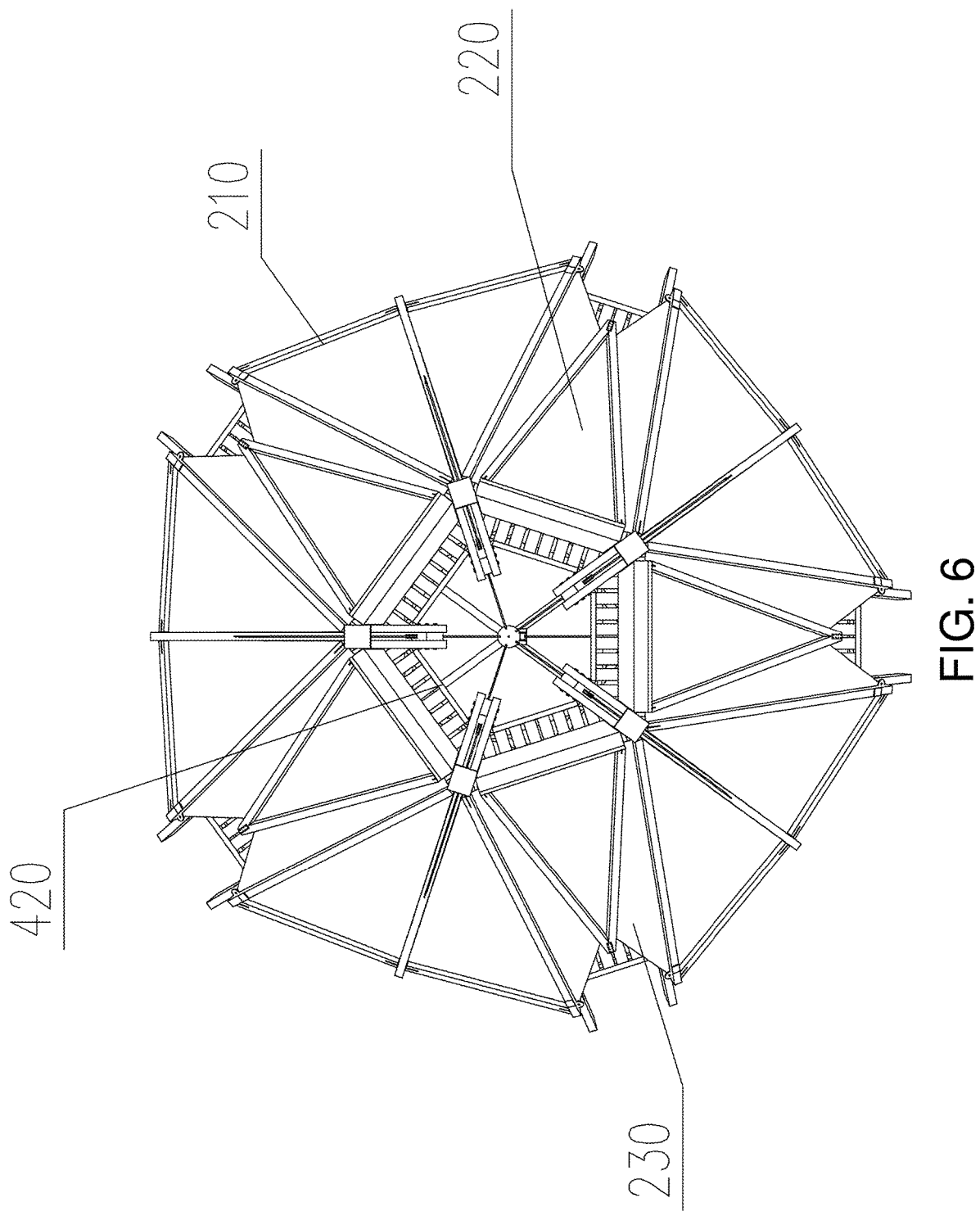
FIG. 6 is a top view of the landscape pavilion provided by the embodiment of the disclosure (the ceiling is in the folded state)
Figure 7:
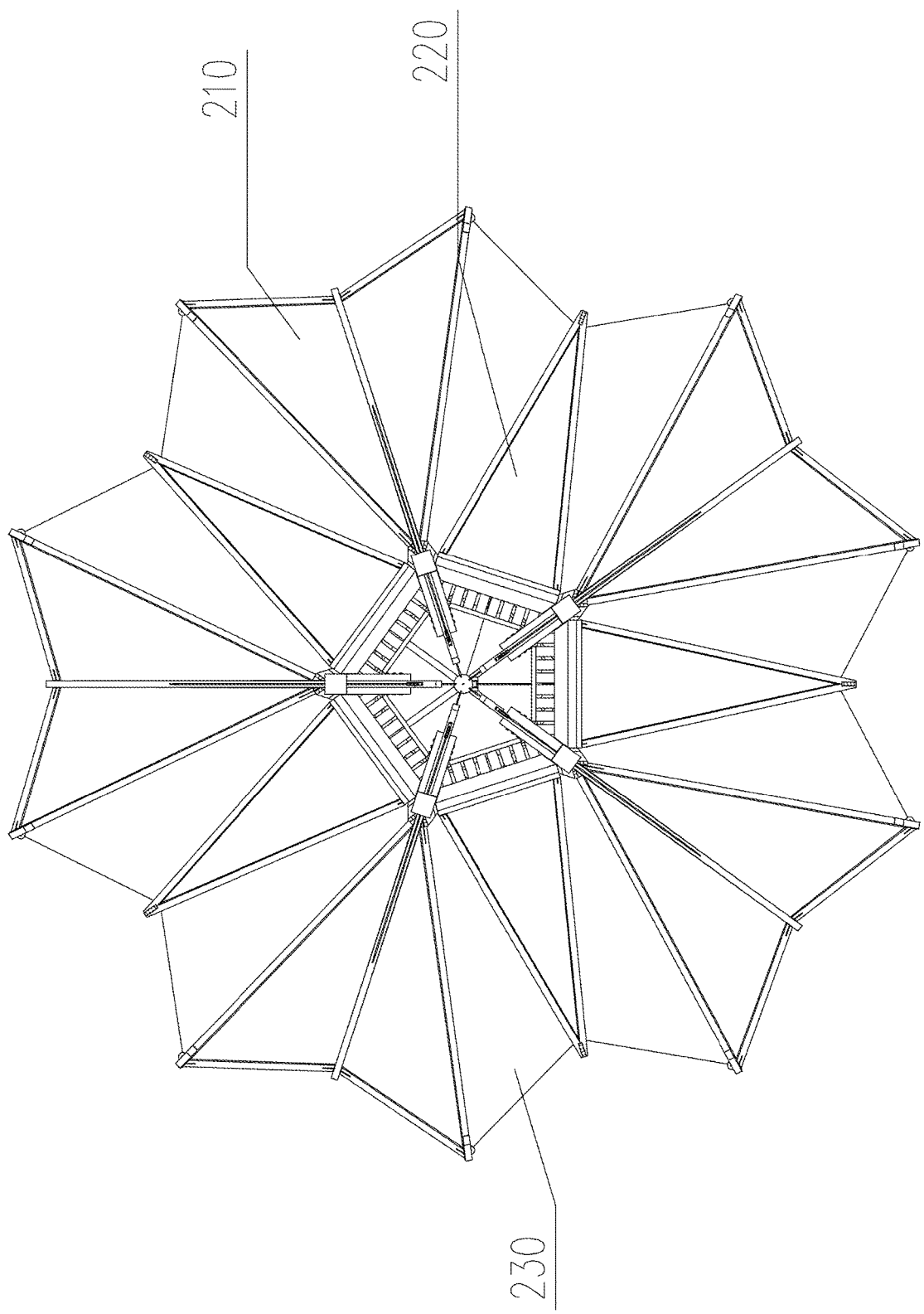
FIG. 7 is the top view of the landscape pavilion provided by the embodiment of the disclosure (the ceiling is in the semi-unfolded state)
Figure 8:
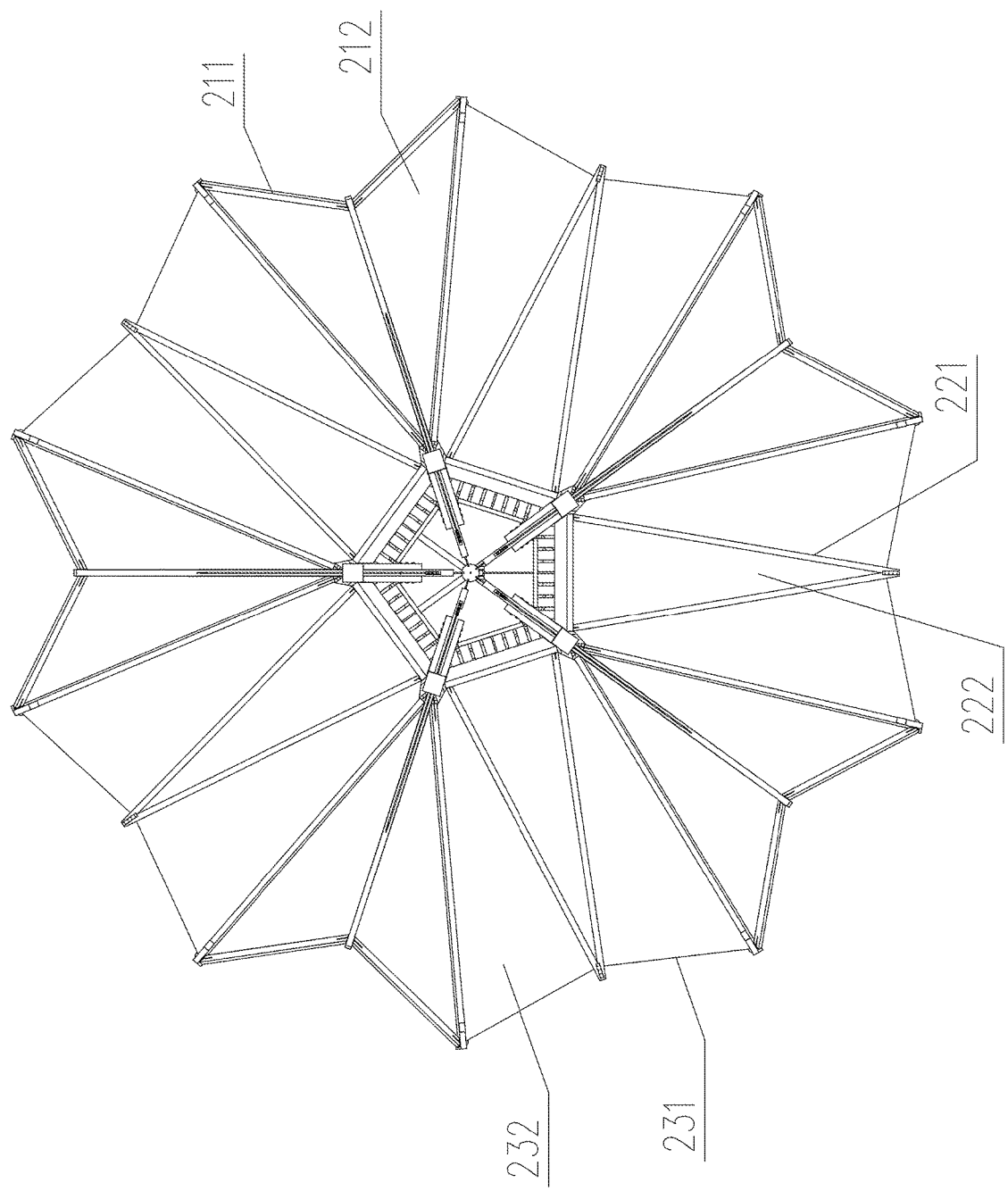
FIG. 8 is the top view of the landscape pavilion provided by the embodiment of the disclosure (the ceiling is in the completely unfolded state)
Figure 9:
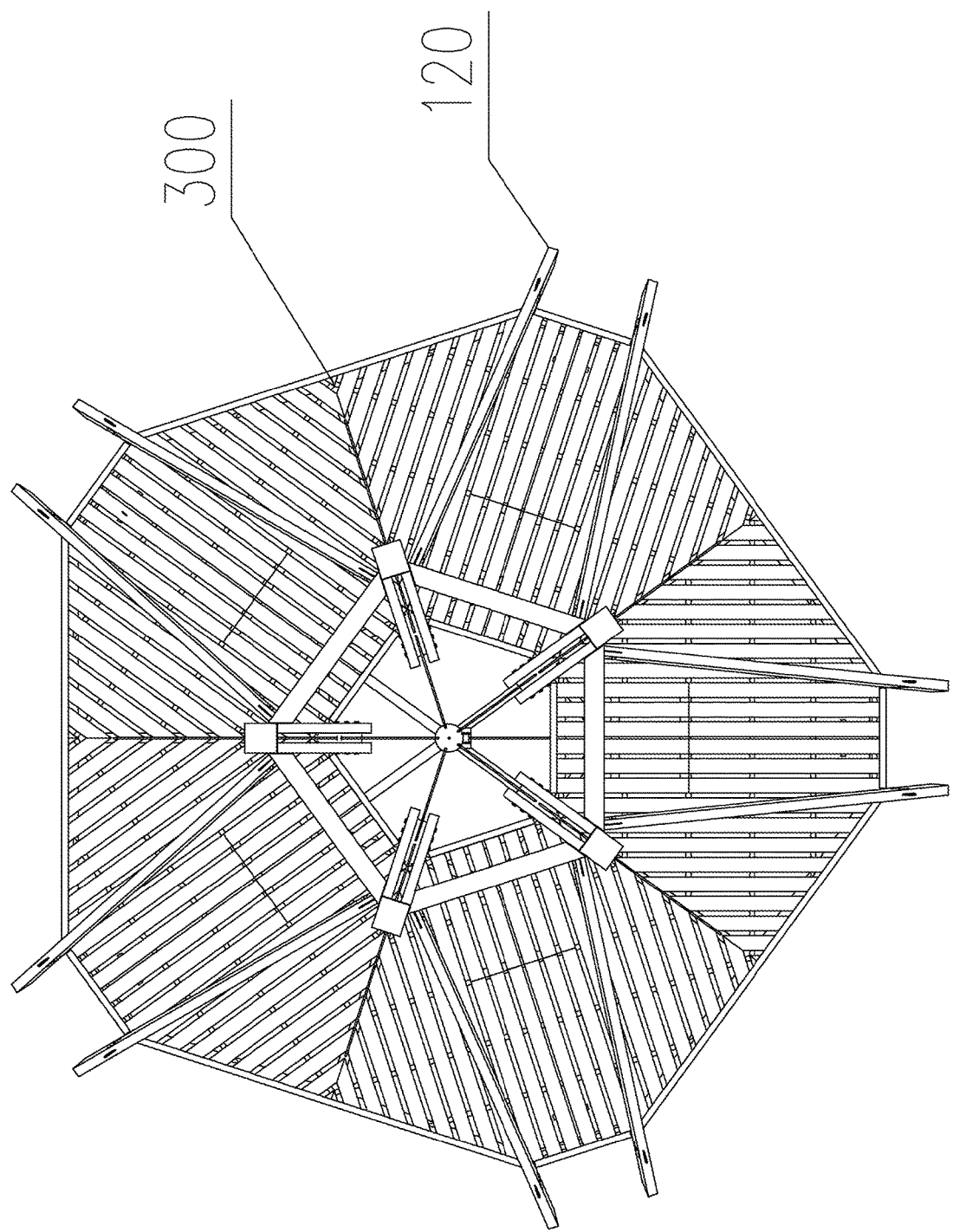
FIG. 9 is the top view of the landscape pavilion provided by the embodiment of the disclosure (the ceiling is not shown)
Figure 10:
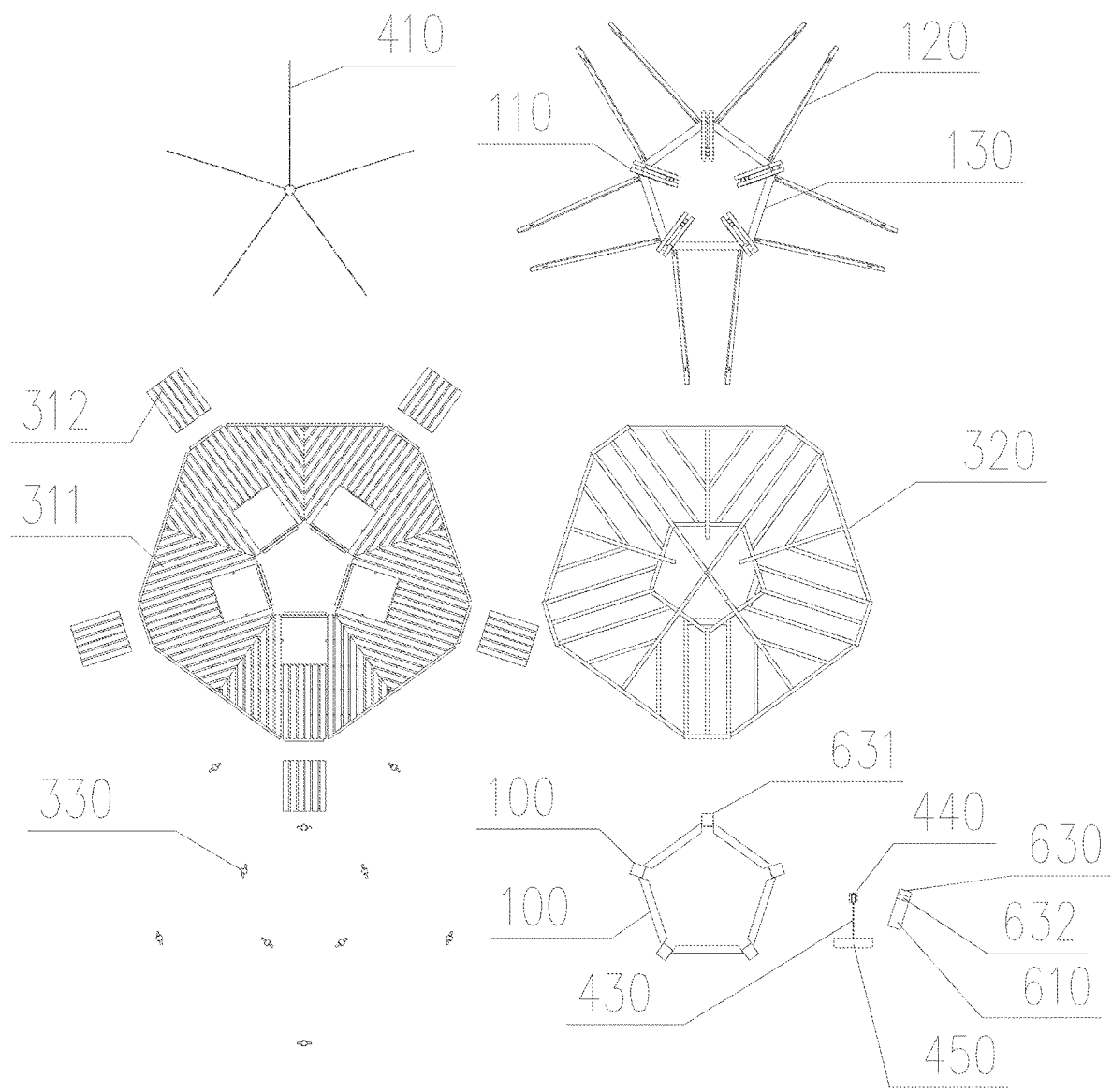
FIG. 10 is the exploded view of the landscape pavilion as shown in FIG. 9.
Figure 11:
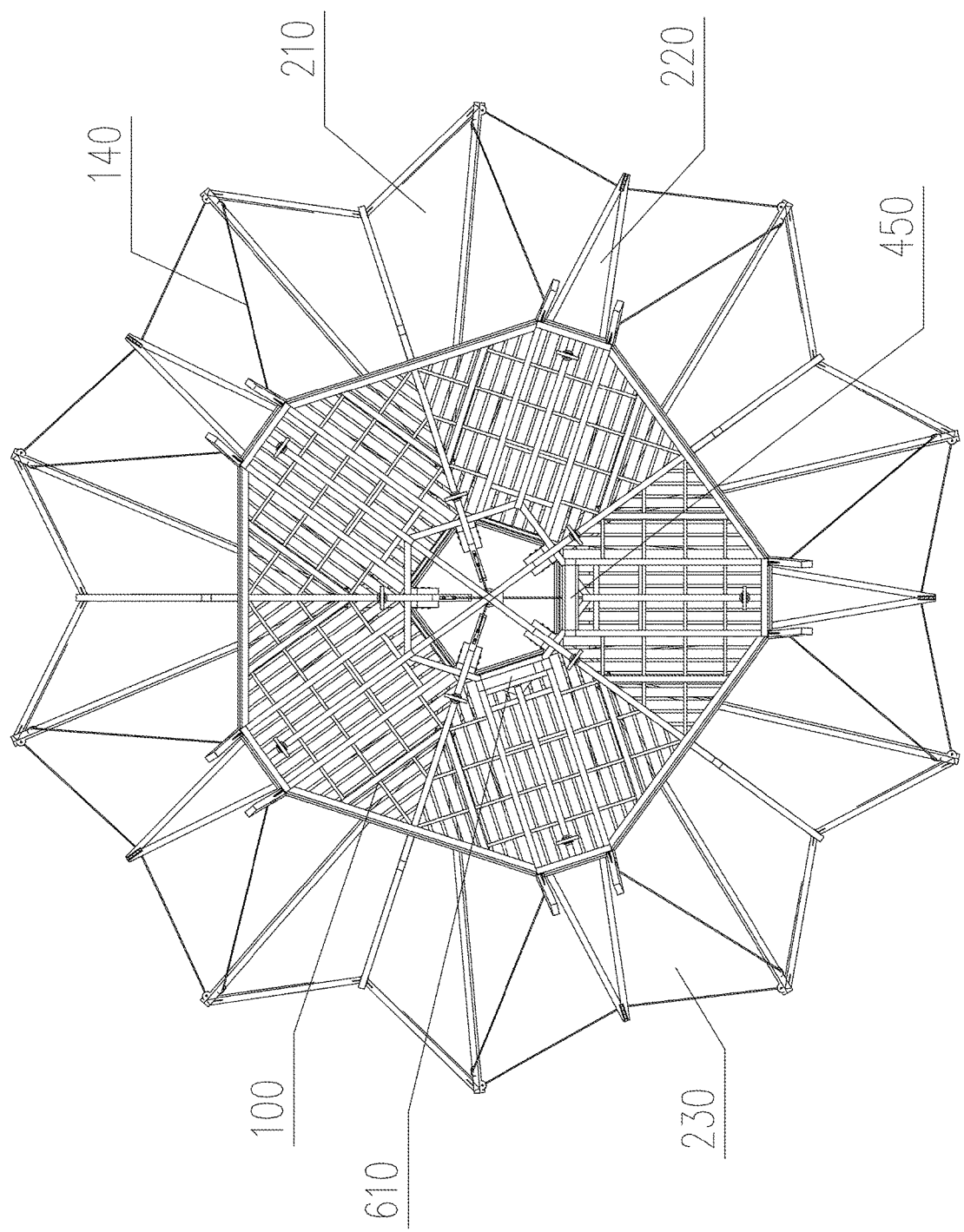
FIG. 11 is a bottom view of the landscape pavilion provided by the embodiment of the disclosure (the ceiling is in the completely unfolded state)
Figure 12:
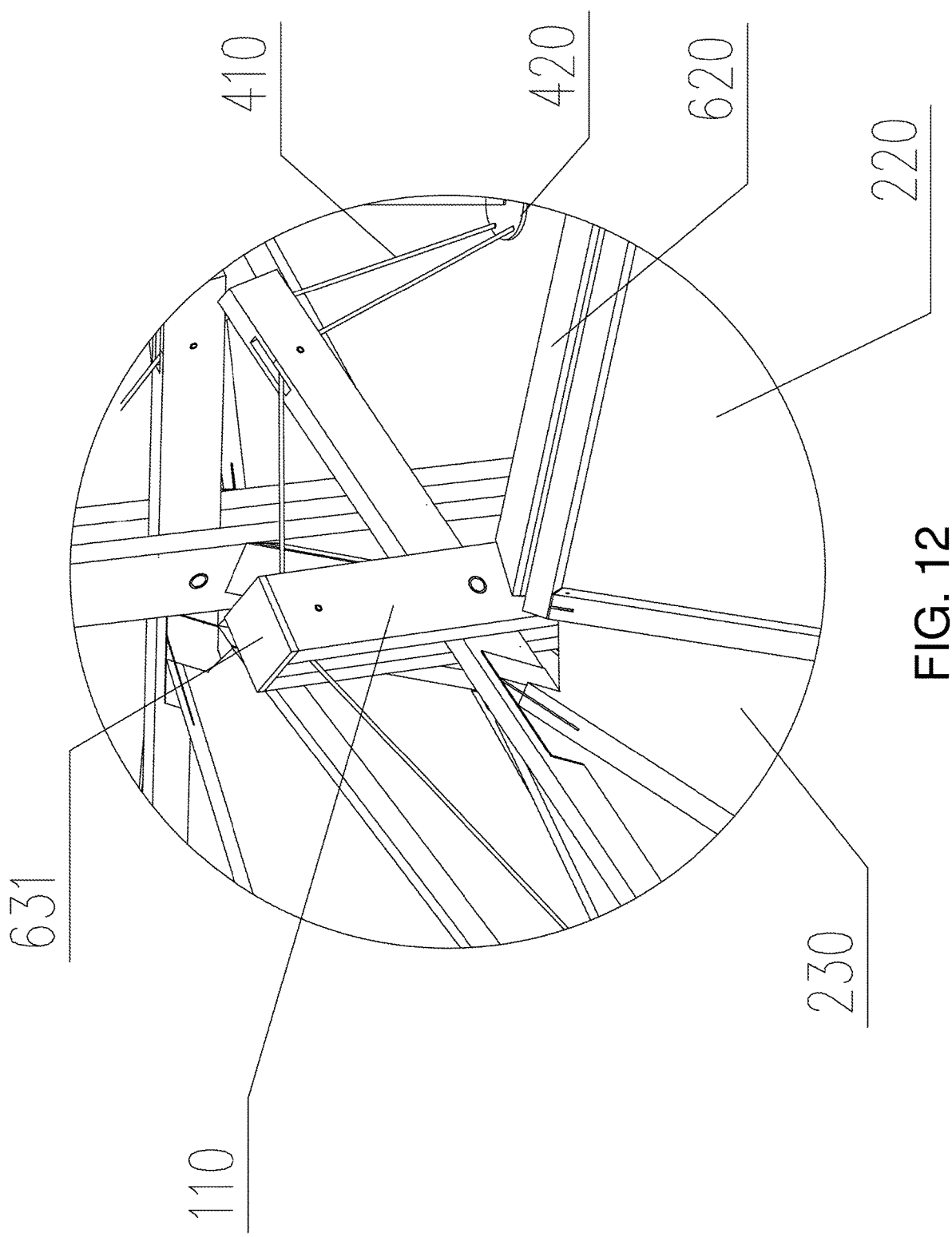
FIG. 12 is an enlarged view of the landscape pavilion as shown in FIG. 2 (the ceiling is in the semi-unfolded state)

As shown in FIG. 1 to 12, a prefabricated movable photosensitively adjustable solar bionic landscape pavilion capable of being disassembled and constructed quickly comprises a support structure 100, a ceiling 200, a movable platform 300, a linkage system 400, a lighting system 500, and an energy system 600; the support structure 100 is arranged at the center of the movable platform 300 and forms large-area shelter space with the ceiling 200; the ceiling 200 may rotate around the support structure 100 in the height direction of the support structure 100 so as to be unfolded or folded; the movable platform 300 is a base of the landscape pavilion, undertakes the support structure 100 and the ceiling 200 above the movable platform, and meanwhile, provides fixing space for the linkage system 400, the lighting system 500, and the energy system 600.

The support structure 100 comprises beams 130 of a pentagonal structure; a central column 110 and two peripheral columns 120 are arranged at an intersection point of every two beams 130 to form a pyramid structure; each central column 110 is connected to the corresponding peripheral columns 120 in an inserting manner by T-shaped steel components with certain angles; the steel components are connected to the central columns 110 and the peripheral columns 120 by bolts and screws, and may be split when necessary. The central columns 110 and the peripheral columns 120 are connected to the beams 130 in the inserting manner by T-shaped steel components; the steel components are connected to the beams 130 by the bolts and the screws, and may be split when necessary.

The support structure 100 comprises five groups of pyramid structures of the same structure; the tops of the five groups of the pyramid structures are connected through the beams; the bottoms of the five groups of the pyramid structures form a stable overall structure with the movable platform 300; the bottoms of the central columns 110 of each group of the pyramid structures are connected to the inner side of the movable platform 300; the two peripheral columns 120 are connected to the outer side of the movable platform 300.

The support structure 100 further comprises wind resistant steel cables 140; the wind resistant steel cables 140 comprise ten strands and are detachable; the two ends of each of the wind resistant steel cables 140 are respectively connected to the outer edge vertexes of the ceiling 200 and the outer edge vertexes of a polygon of the movable platform 300; the lengths of the wind resistant steel cables 140 are fixed; when the ceiling is opened to the maximum, the wind resistant steel cables are tightened, and the ceiling is not opened any longer, such that the ceiling is prevented from being uncovered by extreme wind in extreme weather conditions.

The ceiling 200 is arranged between the support structure 100 and the movable platform 300 and is connected to the support structure 100 at the upper part. The ceiling 200 is arranged in the axial direction of the support structure 100, and the ceiling 200 may rotate around the support structure in the height direction of the support structure 100 so as to be unfolded or folded.

The ceiling consists of a steel cable-wood structural frame and flexible membranes. The flexible membranes have rainproof, sun-shading and breathable performance, and meanwhile, is strong in weather resistance. The ceiling is divided into five modules with consistent shapes and sizes; the top of each module is hinged to the top of the support structure 100; each module of the ceiling 200 consists of a driving panel 210, a driven panel 220, and a flexible panel 230; the driving panels 210 are formed by fixedly connecting multiple wood beams with flexible membranes; the wood beams are connected to one another by T-shaped steel components, are connected by bolts and screws, and may be split when necessary; the wood beams are fixedly connected to the flexible membranes. Pulleys are arranged on the wood beams of the driving panels 210; the pulleys are connected to the structural cables 410 of the linkage system 400; the driving panels 210 is rotated at the upper ends of the central columns 110 within the range of 60 degrees by means of the pulling of the structural cables 410; the driven panels 220 are formed by fixedly connecting multiple wood beams with flexible membranes; the wood beams are connected to one another by T-shaped steel components, are connected by bolts and screws, and may be split when necessary; the wood beams are fixedly connected to the flexible membranes. The driven panels 220 are connected to the beams 130 of the support structure 100 through metal hinges and may rotate outside the beams 130 within the range of 90 degrees; the flexible panels 230 consist of steel cables and flexible membranes; the multiple groups of the driving panels 210 are fixedly connected to the multiple groups of the driven panels 220 through the flexible panels 230; the edges of the flexible membranes are covered, so the steel cables slide therein freely.

The driving panels 210 may rotate and unfold around the top of the support structure 100, such that the flexible panels 230 are tensioned and overturned to drive the driven panels 220 to rotate and unfold, thereby increasing the area of the ceiling 200.

Or, the driving panels 210 may rotate and fold around the top of the support structure 100, such that the flexible panels 230 are tensioned and overturned to drive the driven panels 220 to rotate and fold, thereby reducing the area of the ceiling 200.

The movable platform 300 is of a pentagonal structure; the support structure 100 is located at the center of the movable platform 300; the bottom of each of the central columns 110 and the peripheral columns 120 of the support structure 100 is rigidly connected to the movable platform 300, wherein the central columns 110 on the inner side are directly connected to the movable platform in the inserting manner by bolts; the peripheral columns 120 on the outer side are connected to the movable platform in the inserting manner by T-shaped steel pieces.

The movable platform 300 comprises a wood plate plane 310, a steel structural frame 320, and bottom steel wheels 330; the wood plate plane 310 is connected to the steel structural frame 320 through keels; the bottom steel wheels 330 are universal wheels with brakes, are arranged at the bottom of the steel structural frame 320 and uniformly distributed along the outer side and the inner side, and meanwhile, are connected to the steel structural frame 320 by bolts. After the construction of the landscape pavilion is completed, a pavilion body may be pushed to adjust the position thereof; after the position is determined, the position of the landscape pavilion may be fixed by adjusting a brake button so as to prevent the landscape from moving.

The wood plate plane 310 comprises fixed wood plates 311 and movable wood plates 312; one side of each movable wood plate 312 is fixedly hinged to the corresponding fixed wood plate 311; the opposite side of each movable wood plate 312 rotates as needed and forms a certain opening angle with the platform on which the fixed wood plates 311 are located; the range of the opening angle is 0 to 90 degrees, preferably 45 degrees, such that a backrest is formed to provide a rest facility for a tourist.

The steel structural frame 320 is formed by splicing steel pipes with square sections by bolts, and may be split when necessary. The wood plate plane 310 is paved on the steel structural frame 320 to form a polygonal frame structure provided with a pentagonal center hole in the center; the steel structural frame 320 is connected to the support structure 100 by bolts.

The linkage system 400 comprises structural cables 410, a connecting steel plate 420, a central main steel cable 430, a fixed pulley 440, and a motor 450; the structural cables 410 are multistranded; one end of each structural cable is connected to the wood beam of the corresponding driving panel 210 of the ceiling 200 and the pulley at the top end of the corresponding central column 110 of the support structure 100; the other ends of the structural cables 410 intersect at the center of the landscape pavilion, and are fixed to the connecting steel plate 420; one end of the central main steel cable 430 is connected to the connecting steel plate 420, and the other end of the central main steel cable 430 penetrates through the fixed pulley 440 and finally winds the motor 450 to realize the opening and closing of the ceiling and the movement of the landscape pavilion; the fixed pulley 440 is fixed to the center of the steel structural frame 320 of the movable platform 300 by bolts; the motor 450 is fixed to the bottom of the steel structural frame 320 of the movable platform 300 by bolts.

The motor 450 controls the height of the connecting steel plate 420 by tightening and loosening the central main steel cable 430; the connecting steel plate 420 drives the structural cable 410 to change the position thereof so as to pull the ceiling 200 and adjust the opening angle of the ceiling 200.

The linkage system 400 further comprises wind resistant steel cables 140; the two ends of each of the wind resistant steel cables 140 are respectively connected to the outer edge vertexes of the ceiling 200 and the movable platform 300; the lengths of the wind resistant steel cables 140 are fixed; when the ceiling 200 is opened to the maximum, the wind resistant steel cables 140 are tightened, and the ceiling 200 is not opened any longer.

The lighting system 500 consists of LED light strips; the light strips are arranged along the inner sides of the support structure 100 and a skeleton of the ceiling 200 and are connected to the energy system 600; electric energy is provided for the light strips by the energy system, and meanwhile, the turn-on time of the light strips is controlled by a photosensitive induction control assembly of the energy system; the light strips are automatically turned off when natural light is sufficient in the daytime; the light strips are automatically turned on when the natural light is dark during the night.

The energy system 600 comprises solar panels 620, a storage battery 610, and an induction control assembly 630; the energy system provides the electric energy for the linkage system so as to open and close the ceiling. The energy system provides the electric energy for the lighting system to realize night lighting of the landscape pavilion.

Two groups of the solar panels 620 in total are fixed to the top end of the support structure 100; each group of the solar panels consists of five solar panels with the same size and is connected to the storage battery 610;

the storage battery 610 is fixed to the bottom of the movable platform 300 and is adjacent to the motor. The storage battery is characterized by low voltage and high capacity, and provides sufficient power for the motor. When the sunlight is sufficient, the electric energy is stored by generating electricity through the solar panels.

The induction control assembly 630 is connected to the storage battery 610, the lighting system 500, and the linkage system 400, and provides corresponding energy source for the lighting system 500 and the linkage system 400 according to the intensity of the natural light.

The induction control assembly 630 comprises a photosensitive inductor 631 and a control system 632, wherein the photosensitive inductor 631 is located at the top end of the support structure 100; the control system 632 is located at the bottom end of the movable platform 300; the control system 632 is connected to the movable platform 300 through a circuit; the control system 632 is connected to the storage battery 610, the lighting system 500, and the linkage system 400, controls the current of the storage battery 610 to be conducted into the lighting system 500, and meanwhile, controls the conducting time and direction of the current of the storage battery 610 to the linkage system 400.

When the sunlight is strong in the daytime, the photosensitive inductor transmits a signal to the control system, and the control system switches on the current of the storage battery and the linkage system and keeps the current flowing in a forward direction; the motor of the linkage system tightens the central main steel cable so as to increase the angle between the ceiling and the support structure, thereby increasing the projection area of the ceiling.

When the natural light is relatively weak or there is rain in the daytime, the photosensitive inductor transmits a signal to the control system, and the control system switches on the current of the storage battery and the linkage system and keeps the current flowing in a reverse direction; the motor of the linkage system loosens the central main steel cable so as to reduce the angle between the ceiling and the support structure, thereby reducing the projection area of the ceiling.

When the natural light is weak near night, the photosensitive inductor transmits a signal to the control system, the control system switches on the current of the storage battery and the lighting system, the LED light strips are turned on to achieve a night lighting effect.

When the natural light is sufficient in the daytime, the photosensitive inductor transmits a signal to the control system, the control system switches off the current of the storage battery and the lighting system; the LED light strips are turned off to save energy.

The landscape pavilion comprises a wireless router which can provide wireless WIFI.

The beams 130 at the top of the support structure 100 may also form a triangle, a quadrangle, a pentagon, a hexagon, a heptagon, an octagon, a nonagon, a decagon, a hendecagon, and a dodecagon; the movable platform 300 corresponds to the shape of the beams 130 to adapt to environmental space.

The embodiment further provides a landscape pavilion with a marker. According to the landscape pavilion with the marker, the marker is fixed to the top of the above-mentioned landscape pavilion, namely, the marker is fixedly connected to the top of the ceiling 200; the marker may be, for example, in the shapes of a cartoon pattern, a figure, a sports meeting logo, an animal, a LOGO, and the like; through the marker, the identification degree of a kiosk is improved so as to improve the aesthetic degree of the kiosk to a certain extent. In a specific environment, the landscape pavilion may also become the highlight of a city or a scenic spot.

According to the landscape pavilion of the embodiment, the landscape pavilions placed at the places, such as the city, the scenic spot, a square and a shopping mall, can quickly arouse the curiosity of people and attract people to watch, understand and take group photos and photos by adopting an appearance design with strong cultural connotations and sense of science and technology.

Finally, it should be noted that: the above-mentioned embodiments are only used for illustrating rather than limiting the technical solution of the disclosure. Although the disclosure is described in detail with reference to the above-mentioned embodiments, those skilled in the art should understand that modifications still may be made on the technical solutions recorded in the above-mentioned embodiments, or equivalent substitutions may be made on some or all of the technical features therein; however, these modifications or substitutions do not make the essence of the corresponding technical solutions out of the scope of the technical solutions of the embodiments of the disclosure.

What is claimed is:

1. A prefabricated, movable, photosensitive, solar landscape pavilion, comprising a support structure, a ceiling, a movable platform, a linkage system, a lighting system, and a photosensitive energy system;

wherein the movable platform is a base of the landscape pavilion and supports the support structure and the ceiling;

wherein the support structure is arranged at a center of the movable platform and together with the ceiling forms a large-area shelter space;

wherein the ceiling is rotatable around the support structure in the vertical direction of the support structure, so as to fold and unfold; and wherein the movable platform provides space for attachment thereto of the linkage system, the lighting system, and the photosensitive energy system.

2. The prefabricated, movable, photosensitive, solar landscape pavilion according to claim 1, wherein the support structure having a top and a bottom, comprises beams of a polygonal structure, a central column and two peripheral columns, each of the columns having a top and bottom, are arranged at an intersection point of every two beams to form a pyramid stable structure; and wherein the support structure further comprises a plurality of wind resistant steel cables which are multistranded and detachable, and one end of each wind resistant steel cables is connected to an outer edge vertex of the ceiling and an other end of the wind resistant steel cable is connected to an outer edge vertex of a polygonal beam of the movable platform, and the lengths of the wind resistant steel cables are constant;

wherein the ceiling is divided into multiple modules with consistent shapes and sizes and a top portion of each module is hinged to the top of the support structure;

wherein the movable platform is of a polygonal structure, having and inner side and an outer side, and the support structure is located at the center of the movable platform, and the bottom of each of central columns and peripheral columns of the support structure is rigidly connected to the movable platform;

wherein the linkage system comprises structural cables, a connecting steel plate, a central main steel cable, a fixed pulley, and a motor;

wherein one end of each structural cable is connected to the ceiling, and an other end of each structural cable is fixed to the connecting steel plate; and one end of the central main steel cable is connected to the connecting steel plate, and an other end of the central main steel cable passes through the fixed pulley and winds the motor to open and close the ceiling;

wherein the lighting system includes LED light strips arranged along inner sides of the support structure and a skeleton of the ceiling, and are connected to the photosensitive energy system;

wherein the photosensitive energy system includes solar panels, a storage battery, and a photosensitive induction control assembly of the photosensitive energy system, wherein the solar panels are fixed to the top of the support structure and are connected to the storage battery; the storage battery is fixed to a bottom of the movable platform; and wherein the photosensitive induction control assembly is connected to the storage battery, the lighting system, and the linkage system, and provides an energy source for both the lighting system and the linkage system in response to light intensity.

3. The prefabricated, movable, photosensitive, solar landscape pavilion according to claim 1, wherein the support structure comprises multiple groups of pyramid structures of the same structure, each of the groups of pyramid structures having a top and a bottom;

wherein the tops of the multiple groups of the pyramid structures are connected through the beams, and the bottoms of the multiple groups of the pyramid structures form a stable overall structure with the movable platform; and wherein the bottoms of the central columns of each group of the pyramid structures are connected to the inner side of the movable platform, and the two peripheral columns are connected to the outer side of the movable platform.

4. The prefabricated, movable, photosensitive, solar landscape pavilion according to claim 2, wherein a plurality of driving panels, driven panels, and flexible panels form the ceiling;

the driving panels are formed of fixedly connected wood beams with flexible membranes and pulleys arranged on the wood beams of the driving panels, and the pulleys connect to the structural cables of the linkage system, and the driving panels are rotatable at the tops of the central columns within the range of 60 degrees by pulling the structural cables;

the driven panels are formed of fixedly connected wood beams with flexible membranes, and the driven panels connect to the beams of the support structure through metal hinges and are rotatable outside the beams within the range of 90 degrees; and the flexible panels are formed of steel cables and flexible membranes having edge portions, and the plurality of driving panels are fixedly connected to multiple groups of the plurality of driven panels through the flexible panels, and the edge portions of the flexible membranes are covered, allowing the steel cables to slide therein freely.

5. The prefabricated, movable, photosensitive, solar landscape pavilion according to claim 4, wherein the driving panels rotate and unfold around the top of the support structure, such that the flexible panels are tensioned and overturned to drive the driven panels to rotate and unfold, thereby increasing the area of the ceiling; or, the driving panels rotate and fold around the top of the support structure, such that the flexible panels are tensioned and overturned to drive the driven panels to rotate and fold, thereby reducing the area of the ceiling.

6. The prefabricated, movable, photosensitive, solar landscape pavilion according to claim 1, wherein the movable platform comprises a wood plate plane, a steel structural frame having a top and a bottom and having outer side forming an outer perimeter and inner side forming an inner perimeter coaxial with the outer perimeter, and bottom steel wheels; and wherein the wood plate plane is connected to the steel structural frame through keels; the bottom steel wheels are universal wheels with brakes, and are arranged at the bottom of the steel structural frame and uniformly distributed along the outer side and the inner side of the steel structural frame, and connected to the steel structural frame by bolts, so as to facilitate movement of the landscape pavilion.

7. The prefabricated, movable, photosensitive, solar landscape pavilion according to claim 6, wherein the wood plate plane comprises fixed wood plates and movable wood plates and one side of each movable wood plate is fixedly hinged to a corresponding one of the fixed wood plates; an opposite side of each movable wood plate rotates as needed and forms an opening angle of from 0 to 90 degrees with the platform on which the fixed wood plate is located; and wherein the steel structural frame is formed of steel pipes spliced with square sections by bolts; the wood plate plane is paved on the steel structural frame to form a polygonal frame structure provided with a polygonal center hole; and the steel structural frame is connected to the support structure by bolts.

8. The prefabricated, movable, photosensitive, solar landscape pavilion according to claim 4, wherein the structural cables of the linkage system are multistranded, and the one end of each structural cable is connected to the wood beams of the driving panels of the ceiling, and a pulley located at the top of a corresponding one of the central columns of the support structure, and the other end of each structural cable intersects at a center of the landscape pavilion, and is fixed to the connecting steel plate;

wherein the fixed pulley is fixed to the center of the steel structural frame of the movable platform by bolts;

wherein the motor is fixed to the bottom of the steel structural frame by bolts and the motor controls the height of the connecting steel plate by tightening and loosening the central main steel cable, and the connecting steel plate drives the structural cable to change the position thereof so as to pull the ceiling and adjust the opening angle of the ceiling.

9. The prefabricated, movable, photosensitive, solar landscape pavilion according to claim 1, wherein the linkage system further comprises wind resistant steel cables, and one end of each wind resistant steel cable connects to the outer edge vertex of the ceiling and an other end of each wind resistant steel cable connects to the movable platform, and the lengths of the wind resistant steel cables are constant, wherein the ceiling is closed by tightening the wind resistant steel cables.

10. The prefabricated, movable, photosensitive, solar landscape pavilion according to claim 2, wherein the photosensitive induction control assembly comprises a photosensitive inductor and a control system;

wherein the photosensitive inductor is located at the top of the support structure and the control system is located at the bottom of the movable platform and the control system is connected to the movable platform through a circuit; and wherein the control system is connected to the storage battery, the lighting system, and the linkage system, and controls the current of the storage battery to be conducted into the lighting system, and further controls the conducting time and direction of the current of the storage battery to the linkage system.

11. The prefabricated movable photosensitive, solar, landscape pavilion according to claim 2, wherein the support structure comprises multiple groups of pyramid structures of the same structure, each of the groups of pyramid structures having a top and a bottom;

wherein the tops of the multiple groups of the pyramid structures are connected through the beams, and the bottoms of the multiple groups of the pyramid structures form a stable overall structure with the movable platform; and wherein the bottom of the central columns of each group of the pyramid structures are connected to the inner side of the movable platform, and the two peripheral columns are connected to the outer side of the movable platform.

* * * * *

UNITED STATES PATENT AND TRADEMARK OFFICE
CERTIFICATE OF CORRECTION

| | | |
|---|---|---|
| PATENT NO. | : 11,572,688 B2 | Page 1 of 1 |
| APPLICATION NO. | : 17/269353 | |
| DATED | : February 7, 2023 | |
| INVENTOR(S) | : Deng et al. | |

It is certified that error appears in the above-identified patent and that said Letters Patent is hereby corrected as shown below:

On the Title Page

Item (73)
Change "(JP)" to -- (CN) --

Signed and Sealed this
Seventh Day of November, 2023

Katherine Kelly Vidal
*Director of the United States Patent and Trademark Office*